May 27, 1930.  C. H. FOLMSBEE  1,760,635
VALVE MECHANISM FOR CAR TANKS
Filed Sept. 27, 1928  2 Sheets-Sheet 1
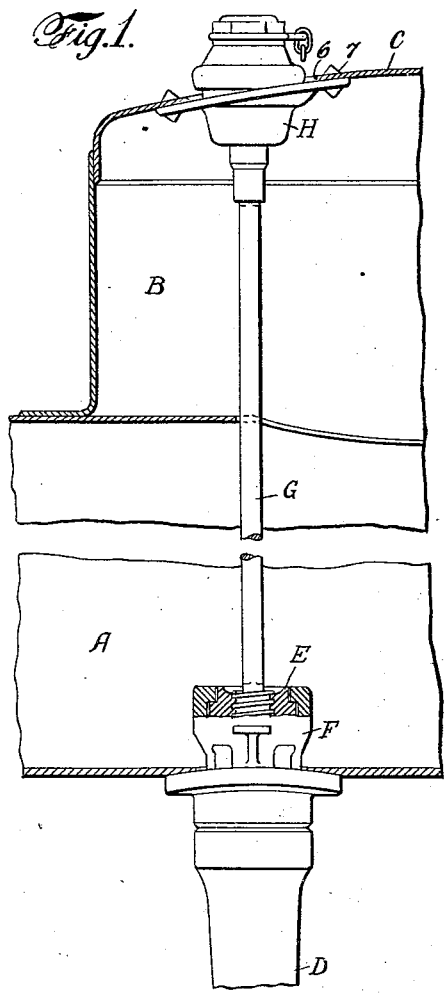
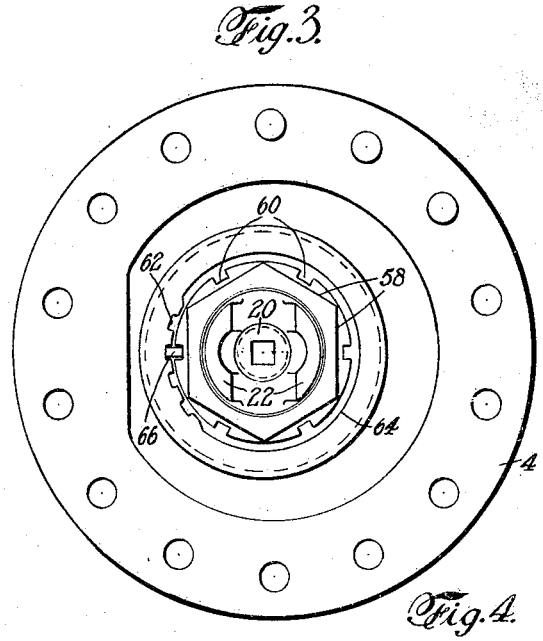
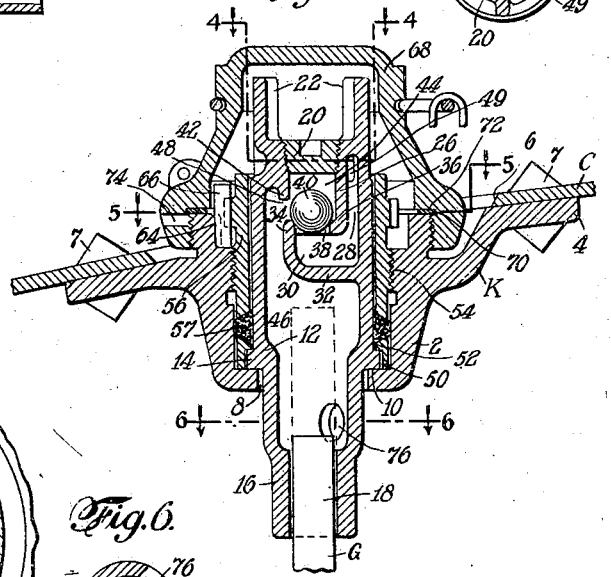
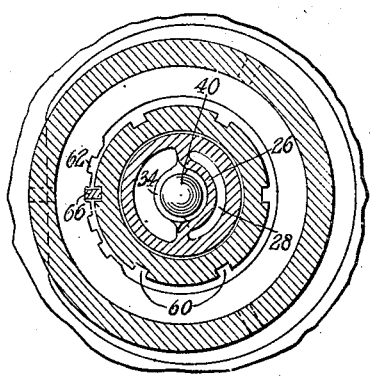
INVENTOR
Clyde H. Folmsbee
BY
ATTORNEY May 27, 1930.  C. H. FOLMSBEE  1,760,635
VALVE MECHANISM FOR CAR TANKS
Filed Sept. 27, 1928  2 Sheets-Sheet 2

INVENTOR
Clyde H. Folmsbee
BY
ATTORNEY

Patented May 27, 1930

1,760,635

UNITED STATES PATENT OFFICE

CLYDE H. FOLMSBEE, OF CRANFORD, NEW JERSEY, ASSIGNOR TO AMERICAN CAR AND FOUNDRY COMPANY, OF NEW YORK, N. Y., A CORPORATION OF NEW JERSEY

VALVE MECHANISM FOR CAR TANKS

Application filed September 27, 1928. Serial No. 308,606.

This invention relates to valve mechanism for use with tanks having bottom discharge outlet valves.

One object of the invention is to provide a combined operating mechanism for bottom discharge outlet valves and a relief valve for the tank.

Another object of the invention is to provide a combined discharge valve operator and relief valve which is normally concealed so as to prevent unauthorized tampering therewith.

A further object of the invention is to provide an improved means for mounting a relief valve mechanism in a tank dome which will also provide a means for mounting the valve operating rod in a suitable manner.

A still further object of the invention is the provision of a unit for attachment or application to a tank dome, which unit embodies the combination of a relief valve for the tank and an operating mechanism for the bottom discharge outlet valve of the tank.

Still another object of the invention is the provision of a device of the character described which is simple in construction, positive in operation and which is strong and durable in use.

Other objects and advantages of this invention will be apparent from the following description taken with the accompanying drawings in which:

Figure 1 is a broken central vertical section of a portion of a car tank showing the present invention applied thereto;

Fig. 2 is a vertical sectional view of the device;

Fig. 3 is a top plan view of the device with the cap removed;

Fig. 4 is a sectional view on the line 4—4 of Fig. 2;

Fig. 5 is a sectional view on the line 5—5 of Fig. 2;

Fig. 6 is a sectional view on the line 6—6 of Fig. 2;

Figure 10:
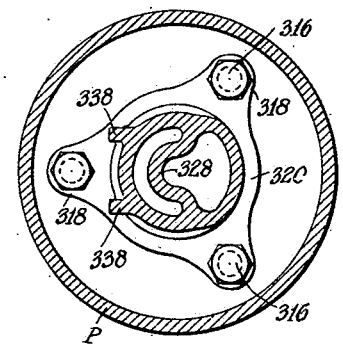
Fig. 10 is a sectional view on the line 10—10 of Fig. 9.

Referring now more particularly to the drawings, in which similar characters of reference designate similar parts in the several views, Figure 1 shows a tank indicated generally at A, the same being provided with a dome B having a dome head C attached thereto in any suitable or desired manner. The tank also is provided with a bottom discharge outlet D controlled by a valve E of the rotary type positioned in a cage F, the valve being operable by a valve rod G which extends upwardly to the device H of the present invention and now to be described.

With particular reference to Fig. 2, the device of the present invention comprises a housing designated generally at K which is preferably of the form shown having a depending recessed base portion 2 and a continuous attaching flange 4 by which the housing may be secured to the interior of the dome head C adjacent an opening 6 therein by means of the rivets 7. The housing has been defined as recessed, but this is merely a question of terminology; the housing being in effect a tubular casting the lower end of which is inwardly flanged defining an opening 8 and also providing a continuous shoulder 10 which supports a tubular valve casting 12; the latter having an annular flange 14 intermediate its ends which seats on the shoulder 10 thereby providing a depending end portion 16 the interior surface of which is squared to receive the squared upper end 18 of the valve rod G.

The upper end of the valve casting is normally closed by a screw plug 20 and extending upwardly from the upper end are spaced lugs 22 between which a suitable tool may be inserted to rotate the casting, and the said upper end of the casting is preferably reinforced by short vertical ribs 24 as seen clearly in Fig. 4.

The interior of the casting 12 is provided with a depending partition 26 which defines an air passage 28 leading to a chamber 30 formed by a partition 32 which extends from the side wall of the casting inwardly and upwardly as shown at 34, the upward extension of the partition 32 being united with the partition 26 as at 36 and having an opening 38 therein which is normally closed by a ball valve 40. Also depending from the top of the casting 12 is a partition 42 which provides a chamber 44 with the plug 20 and partition 26, within which chamber the ball valve is confined; the chamber 44 communicating with the interior 46 of the casting through the space 48 between the upper edge of the partition 32 and the lower edge of the partition 42. The side wall of the casting 12 is provided with an elongated horizontal slot or port 49 which communicates with the passage 28 heretofore mentioned, thereby permitting air to pass into the interior of the valve casting through the port 49 into the passage 28 and then into the chamber 30 and from there, upon displacement of the ball valve, through the space 48 into the interior of the valve casting.

Supported on the shoulder 10 of the housing is a packing ring 50 having a flange 52 which overlaps the flange 14 of the valve casting and serves to prevent vertical movement of the latter in the housing.

The housing 2 is provided with an internally arranged threaded flange 54 to which is secured a gland 56 and interposed between the lower end of the gland and the packing ring 50 is a suitable packing 57 for an obvious purpose. The gland 56 encircles the valve casting as clearly shown in Fig. 2, and the upper end thereof is formed with tool engaging surfaces 58 (see Fig. 3) by which the gland may be screwed home. The gland is further provided with a plurality of recesses 60 which are adapted to align with suitable recesses 62 formed in an annular flange 64 of the housing 2 to receive locking keys 66 to prevent accidental rotation of the gland as will be apparent.

The flange 64 of the housing is arranged in the opening 6 in the dome head and is externally threaded to secure a cap 68 which covers the valve casting. For sealing the interior of the cap, and hence the interior of the valve casting, a gasket 70 is interposed between the upper edge of the flange 64 and a shoulder 72 formed in the lower end of the cap.

During use, gas sometimes passes from the tank past the ball valve, it being apparent that due to jarring or road shocks the valve may and often does vibrate in its seat thereby permitting gas to collect under the cap. The ball valve of course prevents this escape of gas to a certain extent, but in the event that gas does so collect, means are provided for permitting the gas to escape from within the cap to the atmosphere to prevent blowing off of the cap, and to that end the cap is provided with one or more ports or vent 74 through which gas may escape to the atmosphere upon partial rotation of the cap. After the cap has been removed, the valve casting may be rotated to actuate the valve rod G to open the discharge outlet and permit unloading of the tank lading, and during such unloading air may pass from the port 48 to the interior of the valve casting, as herein before described, and from there into the tank through oppositely arranged ports or vents 76; the incoming air of course displacing the ball valve as will be apparent.

Figure 7:
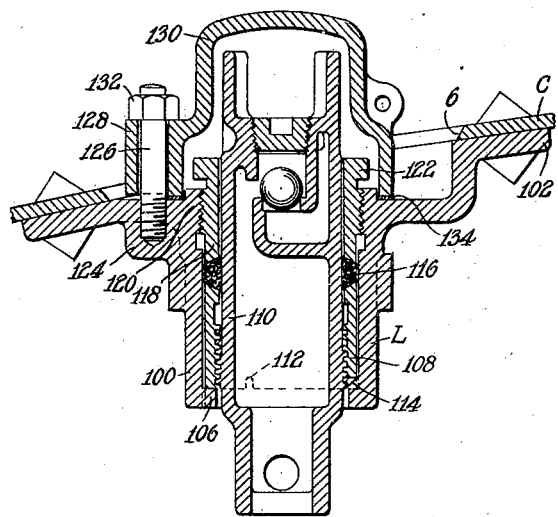
Figs. 7, 8 and 9 are sectional views of modified forms of the device.

Referring now to Fig. 7, wherein a modification of the invention is shown, the invention in this figure embodies a construction in which, when the valve casting is rotated to actuate the valve rod, the casting is elevated thereby preventing the replacement of the cap while the bottom discharge outlet is open and affording a positive and unmistakable notice to an operator that the bottom discharge outlet is open. In this figure, the housing has been designated generally at L and comprises a relatively long tubular portion 100 having an attaching flange 102 at its upper end by which the housing is secured to the dome head C at the opening 6 therein. The lower end of the housing is inwardly flanged to provide a shoulder 106 on which is seated an internally threaded packing ring 108 which adjustably supports an exteriorly threaded valve casting 110. In order to prevent rotation of the packing ring when the valve casting 110 is rotated, the lower edge of the packing ring is provided with a plurality of recesses 112 which receive integral lugs 114 formed on the shoulder 106. With the exception of the external threads by which the casting is mounted, the construction of the casting is identical with that shown in Fig. 2 and the same characters of reference are therefore applied and further description of the specific construction of the valve casting seems to be unnecessary; a description of the casting in Figure 1 sufficing for the description of the valve casting in Fig. 7.

The packing ring 108 of the device shown in Fig. 7 is of substantial height and has a packing 116 mounted on the upper end thereof which is retained by a gland 118. The gland 118 is threadedly engaged with the threaded flange 120 of the housing, the gland having a head 122 by which it may be actuated to position. The housing L shown in Fig. 7 is provided with lugs 124 (one only being shown) which depend from the attaching flange of the housing, said lugs carrying upstanding bolts 126 which extend through apertured lugs 128 on a cap 130. For securing the cap over the valve casting, suitable fasteners such as the nuts 132 are applied. The cap normally seats on a flattened surface formed around the upper end of the housing, and for sealing the interior of the cap against the admission of atmospheric air a gasket 134 is provided as clearly seen in Fig. 7.

Figure 8:
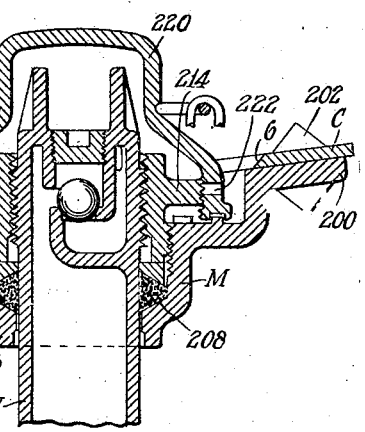

The device shown in Fig. 8 maintains the same general thought as that of the devices shown in Figs. 2 and 7. The housing in Fig. 8 is designated generally at M and is provided with an attaching flange 200 by which the housing may be attached to the dome head C adjacent the opening 6 by means of the rivets 202. The housing comprises a main portion 204 and a reduced lower end 206 defining a shoulder 208 for supporting packing material 210. The body portion 204 of the housing M is interiorly threaded at the upper end thereof to support an interiorly threaded gland 212, which gland is provided with an annular flange 214 which is circumferentially threaded and which is provided with a plurality of openings through which set screws 216 extend to secure the gland in position; the set screws contacting with the flattened surface 218 of the housing M as clearly shown in Fig. 8. The valve casting has been designated generally at N and the same is externally threaded near its upper end whereby said casting may be supported by the external threads of the gland 212. The valve casting N is quite similar to the casting shown in Fig. 7 and also in Fig. 2, that is, as far as the internal construction thereof is concerned, the same having the ball valve shown clearly in Fig. 2 and the operation of the valve casting is the same as that disclosed in Fig. 7 and described with reference to said Fig. 7, so no further description of the valve casting of Fig. 8 seems to be necessary. The external threads of the flange 214 of the gland 212 serve to secure a cap 220, and when the cap is removed atmospheric air passes into the valve casting in a manner hereinbefore described with reference to Figs. 2 and 7. Attention is called to the fact that the construction shown in Fig. 8 permits the elevation of the valve casting N when operating the valve rod G, and when the discharge outlet is open it will be apparent that the cap 220 cannot be replaced. To relieve gas pressure within the cap 220, the latter is provided with a vent 222 the operation of which is similar to that described above with reference to Fig. 2.

Figure 9:
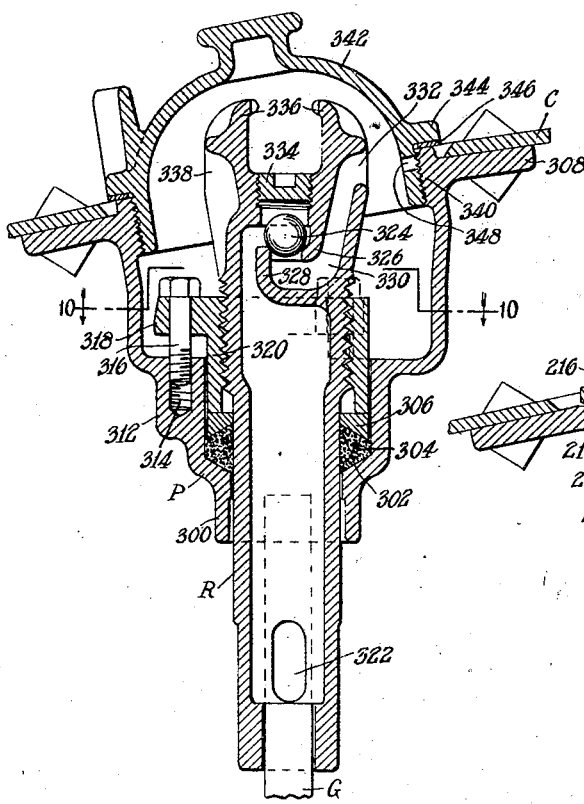

In the form of the invention shown in Fig. 9, the housing P is provided with a reduced lower end 300 forming a seat 302 for packing material 304 on which a packing ring 306 is seated. The housing is provided with an attaching flange 308 by which it is secured to the dome head C adjacent the openings 6 by means of suitable fasteners such as rivets or the like. The housing is provided with spaced lugs 312 provided with tapped recesses 314 in which fasteners such as bolts 316 or the like are secured; the bolts passing through ears 318 formed at the upper end of a tubular, interiorly threaded gland 320, the lower end of which latter bears against the packing ring 306 as clearly shown. The valve casting in this instance is designated generally at R and is tubular in form and is exteriorly threaded near its upper end whereby to be secured in position by the gland 320.

The casting R is provided with a squared lower end to receive the squared upper end of the valve rod G and also is provided with vents 322. The upper end of the casting is provided with a seat for a ball valve 324, formed by the partitions 326 and 328, the partitions defining an air passage 330 from outside the valve casting to the interior thereof, and the ball of the casting being cut out as shown at 332 to define an entrance port for air to be directed into the air passage 330. The upper end of the casting is closed by a plug 334 and is further provided with spaced ears 336 reinforced by ribs 338.

The housing P is provided at its upper end with an interiorly threaded portion 340 which in effect is a flange the upper edge of which extends above the attaching face of the attaching flange 308. The threaded portion 340 secures a cap 342 which is provided with an annular flange 344 adapted to overlie the upper edge of the flange 340 and to secure a sealing gasket 346 for an obvious purpose. Arranged just below the annular flange 344 is a vent 348 which permits any gas which may be collected beneath the cap to escape to the atmosphere upon unscrewing of the cap from its engagement with the flange 340 whereby to prevent blowing off of the cap.

From the above description, it is believed that anyone skilled in the art to which this invention appertains will readily recognize that there has been provided a combined relief valve and discharge valve operator assembled as a unit for attachment to the dome of a car tank. In use, with the parts assembled as shown in Figure 1, for example, the discharge outlet valve cannot be operated until the cap is removed. When the cap is unscrewed, any gas which may have collected therebeneath escapes to the atmosphere through the vents provided in said cap before the cap is entirely removed from the housing. After the cap has been removed, a suitable tool may be inserted between the ears at the top of the valve casting and the valve casting rotated thereby, thereupon actuating the valve rod G to rotate the valve E and permit the discharge of tank lading through the outlet D. During this unloading of the tank lading, it will be apparent that atmospheric air is admitted through the passages provided therefor in the valve casting and the air passage from the valve casting into the tank dome and then, of course, into the tank. With the device as shown in Figs. 7, 8 and 9, rotation of the valve casting also raises the latter and prevents the replacement of the cap until the casting has been reversely rotated to seat the discharge valve E in position to close the discharge outlet.

The drawings herein disclose the preferred embodiment of the invention, together with several modifications thereof, but it is to be understood that various changes in the form and proportions of the devices shown herein may be made within the scope of the appended claims without departing from the spirit of the invention, the drawings being merely illustrative.

What is claimed is:

1. In a car tank, a combined relief valve mechanism and valve rod actuator comprising a housing secured to the tank, a hollow valve casting supported by the housing and with which a valve rod is engaged, and a relief valve in said casting.

2. A valve mechanism for car tanks comprising a housing, a tubular casting supported by the housing, a relief valve in said casting, partitions in the housing defining air passages, said partitions being united and having an opening at their connected portions which is normally closed by said valve, an inlet port in said casting leading to said air passages, and a cover normally concealing the casting.

3. In a car tank, a combined relief valve and valve rod actuator comprising a housing secured to the tank, a valve casting rotatably mounted in the housing and having its lower end formed to receive a valve rod, a relief valve in the casting, air passages leading from outside the casting to the interior thereof, and a cap normally covering the casting.

4. In a car tank, a bottom discharge outlet valve, an operating rod therefor, and means for operating said rod comprising a housing secured to the dome of the tank adjacent an opening therein, a tubular casting rotatably supported by the housing with its upper end extending through the opening and its lower end depending below the housing and having the valve rod extended thereunto, a cap secured to the housing and covering the casting to exclude air therefrom, an air passage leading into the interior of the casting, a valve normally closing said passage to the entrance of atmospheric air, and means on the casting for engagement by a tool whereby the casting may be rotated to operate the valve rod to open the discharge valve whereby tank lading is discharged and the valve in said casting is operated.

5. A device of the kind described comprising a tubular casting having a valve automatically operable therein and provided with a valve rod engaging portion, means for rotatably supporting said casting, and a cap normally covering said casting to exclude air from the interior thereof.

6. In a car tank, a bottom discharge outlet valve and a valve rod therefor, and means for actuating said valve rod and for admitting air into said tank comprising a hollow member rotatably supported and provided with a valve rod engaging portion at its lower end whereby rotation of said member actuates said rod, a valve in said member, a cap normally covering said member and preventing the admission of air thereto, and air inlet and outlet ports leading into the member to direct air therein and from said member to direct air into the tank respectively upon removal of the cap.

7. In a car tank, a bottom discharge outlet valve, a valve rod, and a rotatable valve rod actuator having a relief valve therein to direct air into the tank when the pressure therein becomes less than that outside the tank.

8. In a car tank, a bottom discharge outlet valve, a valve rod therefor, a valve rod actuator, means supporting the actuator, a packing ring in said support enagaging the actuator, a packing gland surrounding the actuator for restraining the latter against vertical movement, means retaining the gland in predetermined position, a relief valve in said actuator normally operable after rotation thereof to open the discharge outlet, and a cap normally covering the actuator to prevent rotation thereof.

9. In a car tank having a bottom discharge outlet valve and a valve rod extending therefrom, a combined valve rod actuator and relief valve mechanism comprising a tubular casting rotatably secured to the tank and into which the valve rod extends to be actuated thereby, a relief valve in said casting, and a cap normally concealing the casting.

10. A relief valve mechanism and valve rod actuator for car tanks comprising a housing secured to the tank, a tubular valve casing supported by the housing and rotatable therein, partitions therein defining passages and a valve seat, a valve on said seat normally separating the passages and preventing passage of fluid therebetween, a port in the casing leading to one of said passages, and a cover concealing the casing and removable to permit rotation thereof and passage of air through the port to the passages.

11. A device of the kind described comprising a valve casing support, a valve casing rotatable therein and having a valve rod connector at one end thereof, a cap normally covering the casing, a relief valve in the casing operable when the cap is removed to permit air to enter the casing, and means surrounding the casing for retaining the casing in normal position in said support.

12. In combination with a car tank having a bottom discharge outlet valve and a valve rod therefor, a relief valve mechanism for the tank comprising a single unit secured to the tank and including a supporting member, a cap therefor arranged without the tank, a tubular actuator with which the upper end of the valve rod is engaged supported by the supporting member, and a relief valve in said actuator.

13. In a car tank, a bottom discharge outlet valve, a valve rod therefor, and actuating means therefor mounted in the tank and provided with a relief valve therein.

14. In a car tank, a bottom discharge outlet valve, a valve rod therefor, and relief valve mechanism mounted in the tank and with which the rod is engaged to be rotated thereby.

15. A container having a discharge port and another port substantially opposite the discharge port, a discharge valve for the discharge port, operating mechanism for the discharge valve, said operating mechanism being operable from said another port, and means carried by the operating mechanism for controlling the flow through said another port to equalize the pressures inside and outside of the container.

In witness whereof I have hereunto set my hand.

CLYDE H. FOLMSBEE.